United States Patent
Matsushita et al.

(10) Patent No.: US 12,092,002 B2
(45) Date of Patent: Sep. 17, 2024

(54) CONTROL DEVICE FOR INTERNAL COMBUSTION ENGINE AND CATALYST DETERIORATION DIAGNOSTIC METHOD

(71) Applicant: Hitachi Astemo, Ltd., Hitachinaka (JP)

(72) Inventors: Shinichi Matsushita, Hitachinaka (JP); Masaki Kobayashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/023,779

(22) PCT Filed: Aug. 6, 2021

(86) PCT No.: PCT/JP2021/029350
§ 371 (c)(1),
(2) Date: Feb. 28, 2023

(87) PCT Pub. No.: WO2022/091523
PCT Pub. Date: May 5, 2022

(65) Prior Publication Data
US 2023/0323804 A1 Oct. 12, 2023

(30) Foreign Application Priority Data
Oct. 29, 2020 (JP) .................. 2020-181184

(51) Int. Cl.
*F01N 11/00* (2006.01)
*F02D 41/02* (2006.01)
*F02D 41/14* (2006.01)
*F02D 41/38* (2006.01)

(52) U.S. Cl.
CPC ........ *F01N 11/007* (2013.01); *F02D 41/0235* (2013.01); *F02D 41/1454* (2013.01);
(Continued)

(58) Field of Classification Search
CPC .......... B01D 2255/908; B01D 53/9445; B01D 53/9477; B01D 53/9495; F01N 11/007;
(Continued)

(56) References Cited

U.S. PATENT DOCUMENTS 5,088,281 A * 2/1992 Izutani .................. F01N 11/007
60/276
5,877,413 A * 3/1999 Hamburg ............ F02D 41/1441
73/114.73
(Continued)

FOREIGN PATENT DOCUMENTS

| JP | 2-33408 A | 2/1990 |
|---|---|---|
| JP | 2010-185371 A | 8/2010 |

(Continued)

OTHER PUBLICATIONS

International Preliminary Report on Patentability (PCT/IB/338 & PCT/IB/373) issued in PCT Application No. PCT/JP2021/029350 dated May 11, 2023, including English translation of document C2 (Japanese-language Written Opinion (PCT/ISA/237) filed on Feb. 28, 2023) (13 pages).
(Continued)

*Primary Examiner* — Jesse S Bogue
(74) *Attorney, Agent, or Firm* — Crowell & Moring LLP

(57) ABSTRACT

An internal combustion engine control device and a catalyst deterioration diagnostic method according to the present invention control the amount of fuel to be supplied to an internal combustion engine such that the air-fuel ratio of the exhaust on the downstream side of the exhaust purification catalyst is alternately switched between rich and lean, measure the oxygen storage capability of the exhaust purification catalyst during a measurement period within a reversal period of the air-fuel ratio, and diagnose deterioration of the exhaust purification catalyst based on a measurement value of the oxygen storage capability. A time point at which the
(Continued)

output of an exhaust sensor indicates that the air-fuel ratio of the exhaust on the downstream side of the exhaust purification catalyst begins to change from a vicinity of a stoichiometric air-fuel ratio to rich or lean is set as the time of end of the measurement period.

5 Claims, 9 Drawing Sheets

(52) U.S. Cl.
CPC .......... F02D 41/38 (2013.01); *F01N 2550/02* (2013.01); *F02D 2200/0816* (2013.01)

(58) Field of Classification Search
CPC ............. F01N 2430/06; F01N 2550/02; F01N 2550/03; F01N 2560/025; F01N 2570/16; F01N 2900/0422; F01N 2900/1624; F01N 3/0814; F01N 3/0864; F01N 3/0871; F01N 3/20; F02D 2200/0816; F02D 41/0235; F02D 41/1454; F02D 41/38; Y02T 10/40

See application file for complete search history.

(56) References Cited

U.S. PATENT DOCUMENTS

| | | | | |
|---|---|---|---|---|
| 6,600,998 | B1* | 7/2003 | Majima | F01N 13/009 702/184 |
| 6,826,902 | B2* | 12/2004 | Sun | F02D 41/1441 60/276 |
| 6,935,155 | B2* | 8/2005 | Yasui | F02D 41/222 123/690 |
| 8,649,956 | B2* | 2/2014 | Kawamura | F02D 41/1495 123/703 |
| 2007/0220862 | A1* | 9/2007 | Suehiro | F02D 41/1441 60/285 |
| 2017/0058749 | A1 | 3/2017 | Miyamoto et al. | |
| 2020/0032730 | A1 | 1/2020 | Ito | |

FOREIGN PATENT DOCUMENTS

| | | | |
|---|---|---|---|
| JP | | 5533471 B2 | 6/2014 |
| WO | WO 2017/168580 A1 | | 10/2017 |

OTHER PUBLICATIONS

International Search Report (PCT/ISA/210) issued in PCT Application No. PCT/JP2021/029350 dated Oct. 26, 2021 with English translation (four (4) pages).

Japanese-language Written Opinion (PCT/ISA/237) issued in PCT Application No. PCT/JP2021/029350 dated Oct. 26, 2021 (four (4) pages).

Extended European Search Report (EESR) mailed Jul. 29, 2024 in Appln No. 21885644.1 (7 pages).

* cited by examiner

CONTROL DEVICE FOR INTERNAL COMBUSTION ENGINE AND CATALYST DETERIORATION DIAGNOSTIC METHOD

TECHNICAL FIELD

The present invention relates to an internal combustion engine control device and to a catalyst deterioration diagnostic method.

BACKGROUND ART

A catalyst deterioration diagnostic device disclosed in Patent Document 1 includes catalyst deterioration determination means for determining deterioration of a catalyst, and sensor deterioration determination means for determining the degree of deterioration of an exhaust sensor, and is characterized in that when catalyst deterioration determination is executed prior to sensor deterioration determination in a current trip, the catalyst deterioration determination is executed using a sensor deterioration degree in a previous trip, when the sensor deterioration determination is then executed in the same trip, it is determined whether a sensor deterioration degree in the previous trip and a sensor deterioration degree in the current trip deviate from each other by a predetermined value or more, and when they deviate from each other by the predetermined value or more, catalyst deterioration determination is performed again using the sensor deterioration degree in the current trip.

REFERENCE DOCUMENT LIST

Patent Document

Patent Document 1: Japanese Patent No. 5533471

SUMMARY OF THE INVENTION

Problem to be Solved by the Invention

If a measurement period for the oxygen storage capability of an exhaust purification catalyst includes a response period of waiting for a response from an exhaust sensor located downstream of the catalyst after the oxygen storage capability reaches its limit (saturation amount or minimum amount), the response period would increase and the oxygen storage capability would be measured to be greater than its actual ability when the response of the exhaust sensor is slow, so that the accuracy of the deterioration diagnosis of the exhaust purification catalyst would deteriorate.

Here, if the effect of the response period on the measurement of the oxygen storage capability is corrected based on a measurement result of the response period, it would be possible to suppress deterioration in the measurement accuracy of the oxygen storage capability when the response of the exhaust sensor is slow.

However, when the above correction is performed, the control specification is complicated because it is necessary to measure the response period of the exhaust sensor, and furthermore, the correction is affected by variations in measurement of the response period of the exhaust sensor, so that the amount of labor required increases to adapt the correction processing based on the measurement result of the response period.

The present invention has been made in view of the conventional circumstances, and it has an object to provide an internal combustion engine control device and a catalyst deterioration diagnostic method that can easily measure the oxygen storage capability while suppressing the effect of the response period of the exhaust sensor.

Means for Solving the Problem

An internal combustion engine control device according to the present invention comprises, in one aspect thereof, an air-fuel ratio control unit that controls an amount of fuel to be supplied to the internal combustion engine such that the air-fuel ratio of exhaust on the downstream side of an exhaust purification catalyst is alternately switched between rich and lean, a measurement unit that measures the oxygen storage capability of the exhaust purification catalyst during a measurement period within a reversal period of the air-fuel ratio by the air-fuel ratio control unit, and a diagnostic unit that diagnoses deterioration of the exhaust purification catalyst based on a measurement value of the oxygen storage capability, wherein the measurement unit sets, as a time of end of the measurement period, a time point at which the output of an exhaust sensor for detecting the air-fuel ratio of the exhaust on the downstream side of the exhaust purification catalyst indicates that the air-fuel ratio of the exhaust on the downstream side of the exhaust purification catalyst begins to change from a vicinity of a stoichiometric air-fuel ratio to rich or lean.

Furthermore, a catalyst deterioration diagnostic method according to the present invention comprises, in one aspect thereof, a first step of controlling an amount of fuel to be supplied to an internal combustion engine such that the air-fuel ratio of exhaust on the downstream side of exhaust purification catalyst is alternatingly switched between rich and lean, a second step of measuring the oxygen storage capability of the exhaust purification catalyst during a measurement period within a reversal period of the air-fuel ratio, and a third step of diagnosing deterioration of the exhaust purification catalyst based on a measurement value of the oxygen storage capability, wherein the second step sets, as a time of end of the measurement period, a time point at which the output of an exhaust sensor for detecting the air-fuel ratio of the exhaust on the downstream side of the exhaust purification catalyst indicates that the air-fuel ratio of the exhaust on the downstream side of the exhaust purification catalyst begins to change from a vicinity of a stoichiometric air-fuel ratio to rich or lean.

Effect of the Invention

According to the foregoing invention, it is possible to easily measure the oxygen storage capability while suppressing the effect of the response period of the exhaust sensor.

MODE FOR CARRYING OUT THE INVENTION

An embodiment of the present invention will be described below.

Figure 1:
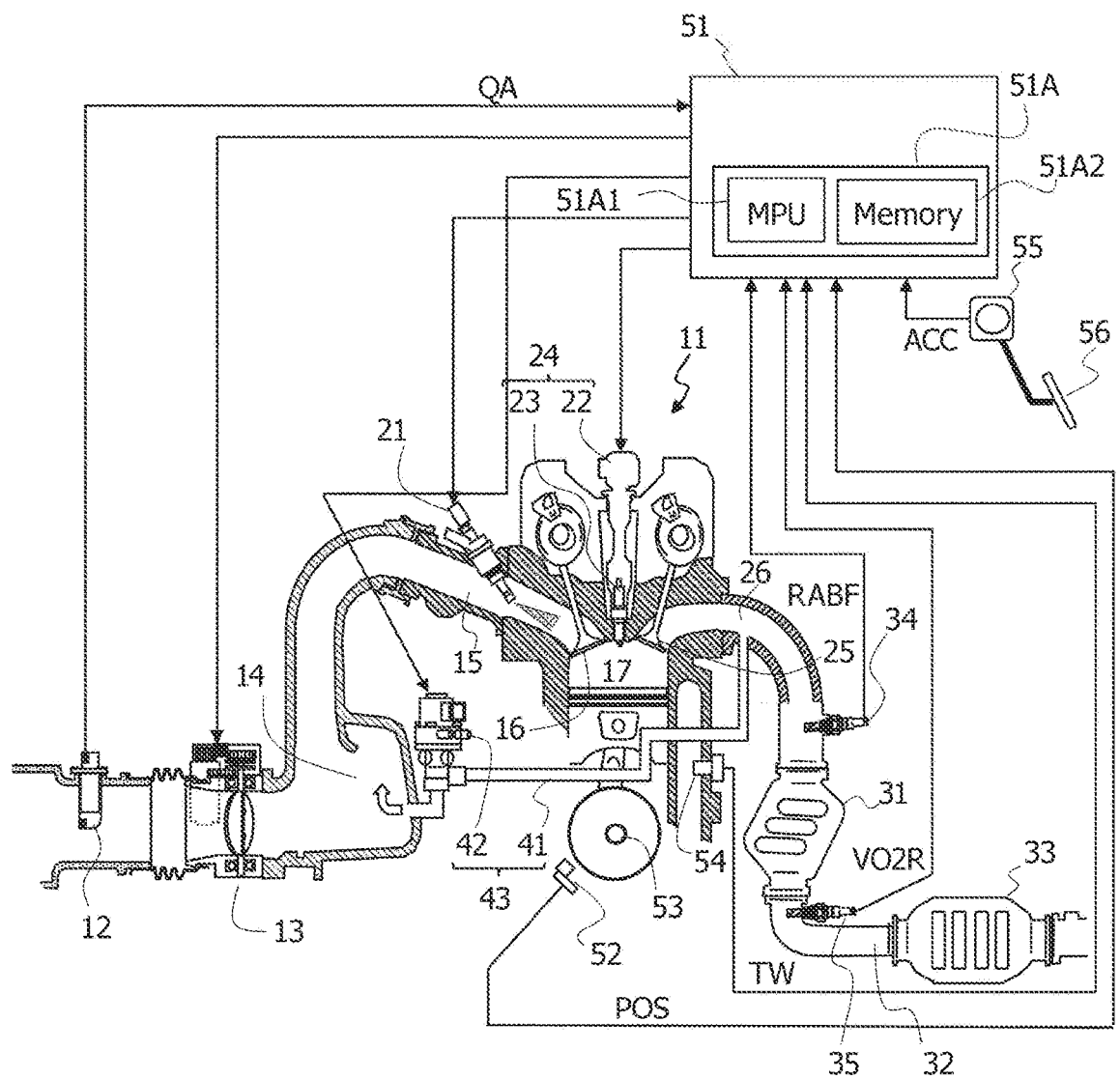
FIG. 1 is a system configuration diagram showing one aspect of an internal combustion engine.

FIG. 1 is a system configuration diagram showing one aspect of an internal combustion engine 11 for a vehicle.

In internal combustion engine 11, intake air passes through an air flowmeter 12, an electronically controlled throttle valve 13, and a collector 14, in this order, and is then drawn into a combustion chamber 17 via an intake pipe 15 and an intake valve 16 which are provided in each cylinder.

A fuel injection valve 21 is installed in intake pipe 15 of each cylinder and injects fuel into intake pipe 15.

Note that internal combustion engine 11 may be a cylinder direct injection type internal combustion engine in which fuel injection valve 21 directly injects fuel into combustion chamber 17.

Internal combustion engine 11 also includes an ignition device 24 having an ignition coil 22 and a spark plug 23 for each cylinder.

The air-fuel mixture in combustion chamber 17 is ignited and combusted with a spark generated by spark plug 23, and an exhaust gas generated in combustion chamber 17 by the combustion is discharged to an exhaust pipe 26 provided in each cylinder through an exhaust valve 25.

An exhaust system of internal combustion engine 11 includes a first exhaust purification catalyst 31 and a second exhaust purification catalyst 33.

First exhaust purification catalyst 31 and second exhaust purification catalyst 33 are exhaust purification devices for purifying the exhaust of internal combustion engine 11 by the action of a catalyst (for example, a three-way catalyst) having oxygen storage capability.

First exhaust purification catalyst 31 is arranged just below an aggregate portion of exhaust pipes 26, and second exhaust purification catalyst 33 is arranged in an exhaust duct 32 located downstream of first exhaust purification catalyst 31.

Internal combustion engine 11 also includes an air-fuel ratio sensor 34 and an oxygen sensor 35 as an exhaust sensor that detects the air-fuel ratio of the exhaust from internal combustion engine 11.

Air-fuel ratio sensor 34 is a whole-range air-fuel ratio sensor for acquiring a linear output signal RABF corresponding to the air-fuel ratio of the exhaust, and provided upstream of first exhaust purification catalyst 31.

On the other hand, oxygen sensor 35 is a rich/lean sensor that detects whether the air-fuel ratio of the exhaust is richer or leaner than a stoichiometric air-fuel ratio (in other words, excess air ratio $\lambda=1$), and it is provided downstream of first exhaust purification catalyst 31, more specifically, downstream of first exhaust purification catalyst 31 and upstream of second exhaust purification catalyst 33.

Oxygen sensor 35 generates an electromotive force corresponding to the concentration of oxygen in the exhaust, and an output signal VO2R (output voltage) changes suddenly with the stoichiometric air-fuel ratio as a boundary.

For example, oxygen sensor 35 outputs a voltage of about 1 V when the air-fuel ratio of the exhaust is richer than the stoichiometric air-fuel ratio, and outputs a voltage close to 0 V when the air-fuel ratio of the exhaust is leaner than the stoichiometric air-fuel ratio.

Internal combustion engine 11 also includes an exhaust gas recirculation device 43.

Exhaust gas recirculation device 43 includes an exhaust gas recirculation pipe 41 for causing exhaust pipe 26 and collector 14 to communicate with each other, and an exhaust gas recirculation control valve 42 for controlling an exhaust gas recirculation amount by adjusting the aperture area of exhaust gas recirculation pipe 41.

Control device 51 is an electronic control device for controlling the operation of internal combustion engine 11, and includes a microcomputer 51A.

Microcomputer 51A includes a microprocessor 51A1, a non-volatile memory 51A2, a volatile memory (not shown), and the like.

Control device 51 acquires detection signals from various sensors, performs arithmetic processing based on these detection signals to acquire operation signals for controlling fuel injection by fuel injection valve 21, the aperture of electrically controlled throttle valve 13, ignition by spark plug 23, the aperture of exhaust gas recirculation control valve 42, and the like, and outputs the operation signals, thereby controlling the operation of internal combustion engine 11.

Control device 51 acquires the output signal RABF of air-fuel ratio sensor 34 and the output signal VO2R of oxygen sensor 35, and also acquires an intake air flow amount signal QA which is related to the intake air flow amount of internal combustion engine 11 and output by air flowmeter 12, a rotation signal POS which is related to the rotational angular position of a crankshaft 53 and output by a crank angle sensor 52, a water temperature signal TW which is related to the temperature of cooling water of internal combustion engine 11 and output by a water temperature sensor 54, an accelerator position signal ACC which is related to the aperture of an accelerator pedal 56 and output by an accelerator position sensor 55 and the like.

Control device 51 calculates a target ignition timing and a target exhaust gas recirculation amount according to engine operating conditions (more specifically, an engine rotation speed, an engine load, an engine temperature, etc.) detected based on the acquired various signals, outputs an ignition control signal to ignition coil 22 according to the target ignition timing, and outputs an aperture control signal to exhaust gas recirculation control valve 42 according to the target exhaust gas recirculation amount.

Furthermore, control device 51 calculates a target aperture TA of electrically controlled throttle valve 13 from the accelerator position ACC, etc., and controls a throttle motor of electrically controlled throttle valve 13 according to the target aperture TA.

Furthermore, control device 51 calculates a fuel injection pulse width TI [ms] proportional to the amount of fuel to be injected from fuel injection valve 21 in one combustion cycle based on the engine operating conditions.

Control device 51 outputs an injection pulse signal having a fuel injection pulse width TI to fuel injection valve 21 at a predetermined injection timing on a cylinder basis to control the amount of fuel to be supplied to internal combustion engine 11, thereby controlling the air-fuel ratio of internal combustion engine 11.

Here, in an operating region where an air-fuel ratio feedback control condition is established, control device 51 corrects the fuel injection pulse width TI based on the output signal RABF of air-fuel ratio sensor 34 and the output signal VO2R of oxygen sensor 35, that is, the air-fuel ratio of the exhaust on the upstream side of first exhaust purification catalyst 31 and the air-fuel ratio of the exhaust on the downstream side of first exhaust purification catalyst 31, thereby automatically adjusting the air-fuel ratio of internal combustion engine 11.

Furthermore, control device 51 has a catalyst deterioration diagnostic function of measuring the oxygen storage capability (in other words, oxygen storage capacity) of first exhaust purification catalyst 31 and determining based on the measured value of the oxygen storage capability whether first exhaust purification catalyst 31 has deteriorated.

Figure 2:
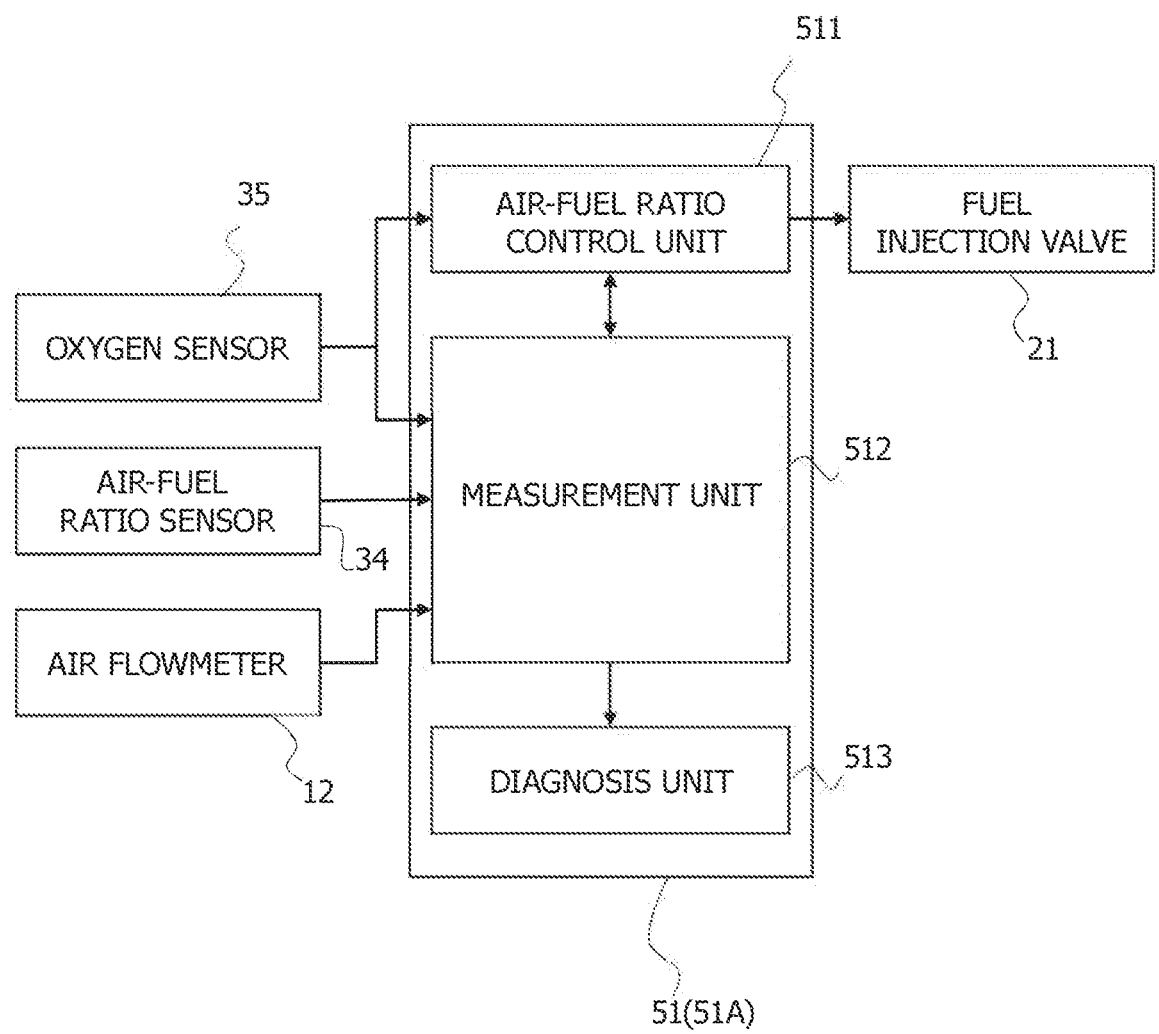
FIG. 2 is a block diagram showing a catalyst deterioration diagnostic function of a control device.

FIG. 2 is a functional block diagram of catalyst deterioration diagnosis in control device 51.

Control device 51 has respective functions of an air-fuel ratio control unit 511, a measurement unit 512, and a diagnostic unit 513 as software for catalyst deterioration diagnosis.

Air-fuel ratio control unit 511 performs active air-fuel ratio control that is control for adjusting the fuel injection amount so that the air-fuel ratio of the exhaust on the downstream side of first exhaust purification catalyst 31 alternately switches between rich and lean.

For example, in a case in which the air-fuel ratio of the exhaust on the downstream side of first exhaust purification catalyst 31 is reversed from rich to lean, air-fuel ratio control unit 511 gradually reduces the fuel injection amount under PI control to make the air-fuel ratio lean, and when the air-fuel ratio of the exhaust on the downstream side of the exhaust purification catalyst 31 has been reversed to lean, air-fuel ratio control unit 511 gradually increases the fuel injection amount under PI control to make the air-fuel ratio rich.

Measurement unit 512 measures the oxygen storage capability of first exhaust purification catalyst 31 during a measurement period MP within an air-fuel ratio reversing period by air-fuel ratio control unit 511.

Specifically, measurement unit 512 calculates, as an index value of the oxygen storage capability, an integration value QAIN of the intake air flow amount QA during the measurement period MP, in other words, the total amount of air which has been taken in by internal combustion engine 11 during the measurement period MP.

Note that the integration value QAIN of the intake air flow amount QA measured by measurement unit 512 corresponds to the total amount of exhaust that has flowed into first exhaust purification catalyst 31 during the measurement period MP.

Based on the measured value (more specifically, the integration value QAIN) of the oxygen storage capability, diagnostic unit 513 determines whether first exhaust purification catalyst 31 has deteriorated, in other words, whether the oxygen storage capability of first exhaust purification catalyst 31 has lowered by a predetermined level or more due to deterioration.

When determining a deterioration state in which the oxygen storage capability of first exhaust purification catalyst 31 has decreased by the predetermined level or more, diagnostic unit 513 outputs a catalyst deterioration determination signal.

Figure 3:
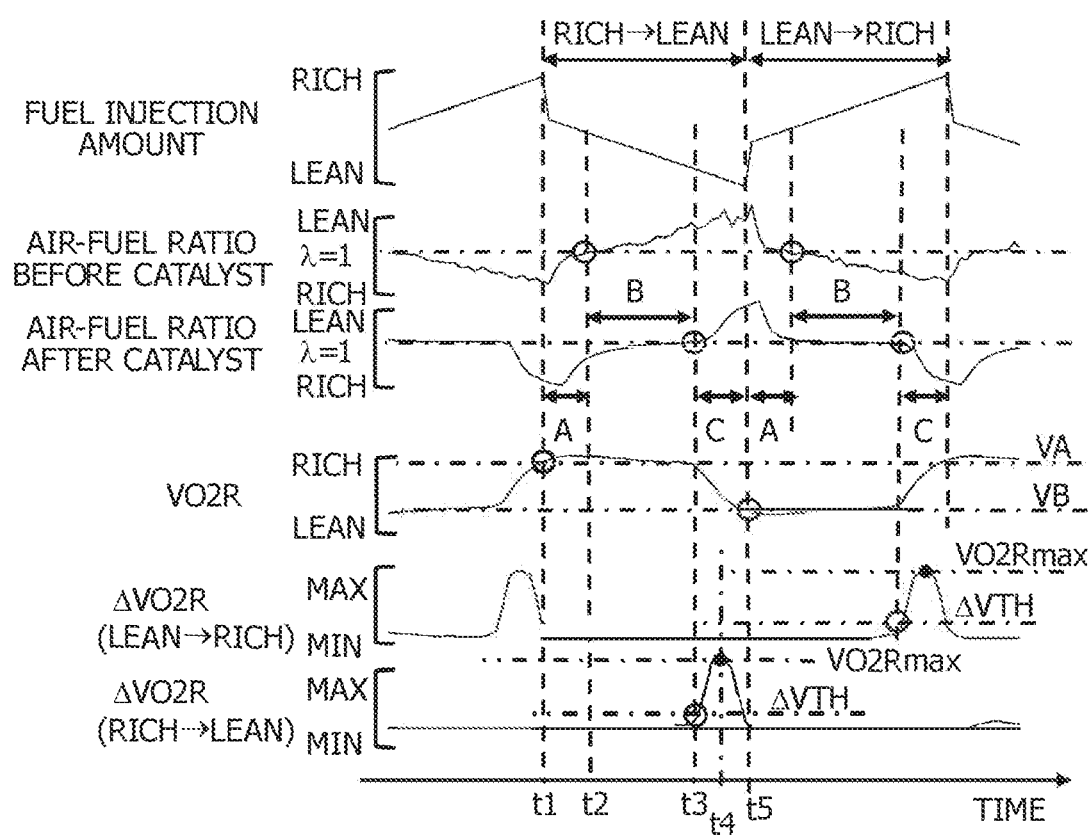
FIG. 3 is a time chart showing a state change during execution of a catalyst deterioration diagnosis.

FIG. 3 is a time chart showing a state change when control device 51 performs a catalyst deterioration diagnosis, more specifically, the changes of the fuel injection amount, the output signal RABF of air-fuel ratio sensor 34, the output signal RABFR of a post-catalyst air-fuel ratio sensor, the output signal VO2R of oxygen sensor 35, and a changing rate $\Delta$VO2R.

Note that the output signal RABFR of the post-catalyst air-fuel ratio sensor shown in FIG. 3 is a signal to be output by the post-catalyst air-fuel ratio sensor when it is assumed that the air-fuel ratio sensor is provided on the downstream side of first exhaust purification catalyst 31, and also is a signal theoretically or experimentally decided in order to observe the correlation between the air-fuel ratio of the exhaust on the downstream side of first exhaust purification catalyst 31 and the output signal VO2R of oxygen sensor 35.

Furthermore, the changing rate $\Delta$VO2R is the absolute value of the amount of change (time derivative) of the output signal VO2R in a certain period of time (for example, 500 ms).

The catalyst deterioration diagnosis by control device 51 will be outlined below with reference to FIG. 3.

For example, when the air-fuel ratio of the exhaust on the downstream side of first exhaust purification catalyst 31 is lean, air-fuel ratio control unit 511 switches the target air-fuel ratio in the control of the fuel injection amount to rich.

Furthermore, when the output signal VO2R of oxygen sensor 35 increases to be larger than a rich determination threshold value VA, that is, when the air-fuel ratio of the exhaust on the downstream side of first exhaust purification catalyst 31 is reversed from lean to rich, air-fuel ratio control unit 511 switches the target air-fuel ratio from rich to lean (time t1 in FIG. 3).

Thereafter, when the output signal VO2R of oxygen sensor 35 decreases to be less than a lean determination threshold value VB (VB<VA), that is, when the air-fuel ratio of the exhaust on the downstream side of first exhaust purification catalyst 31 reverses from rich to lean, air-fuel ratio control unit 511 switches the target air-fuel ratio to rich again (time t5 in FIG. 3).

Subsequently, air-fuel ratio control unit 511 similarly alternately switches the target air-fuel ratio of internal combustion engine 11 between rich and lean in accordance with the output signal VO2R of oxygen sensor 35, thereby alternately switching the air-fuel ratio of the exhaust on the downstream side of first exhaust purification catalyst 31 between rich and lean.

The active air-fuel ratio control by air-fuel ratio control unit 511 repeats an operation of increasing the amount of adsorbed oxygen of first exhaust purification catalyst 31 from a minimum amount (in other words, when the adsorbed oxygen is empty) to a saturation amount and then reducing the amount of adsorbed oxygen from the saturation amount to the minimum amount.

For example, when air-fuel ratio control unit 511 causes lean exhaust to flow into first exhaust purification catalyst 31 from a state in which the amount of adsorbed oxygen of first exhaust purification catalyst 31 has been reduced to the minimum amount by causing rich exhaust to flow into first exhaust purification catalyst 31, first exhaust purification catalyst 31 continues to adsorb excess oxygen in the exhaust, so that the air-fuel ratio of the exhaust on the downstream side of first exhaust purification catalyst 31 is maintained near the stoichiometric air-fuel ratio.

When first exhaust purification catalyst 31 can no longer adsorb oxygen because the amount of oxygen adsorbed by first exhaust purification catalyst 31 has increased from the minimum amount to the saturation amount, lean exhaust is allowed to pass through first exhaust purification catalyst 31, so that the air-fuel ratio of the exhaust on the downstream side of first exhaust purification catalyst 31 changes from near the stoichiometric air-fuel ratio to lean.

In this way, when the amount of oxygen adsorbed by first exhaust purification catalyst 31 reaches the saturation amount and the air-fuel ratio of the exhaust on the downstream side of first exhaust purification catalyst 31 is reversed to lean, air-fuel ratio control unit 511 sets the target air-fuel ratio to rich to cause rich exhaust to flow into first exhaust purification catalyst 31 based on the fact that the output signal VO2R of oxygen sensor 35 becomes less than the lean determination threshold value VB.

At this time, first exhaust purification catalyst 31 continues to release oxygen so as to make up for the shortage of the amount of oxygen in the exhaust, so that the air-fuel ratio of the exhaust on the downstream side of first exhaust purification catalyst 31 is kept near the stoichiometric air-fuel ratio.

Then, when the amount of oxygen adsorbed by first exhaust purification catalyst 31 has decreased from the saturation amount to the minimum amount, and thus first exhaust purification catalyst 31 can no longer release oxygen, the rich exhaust is allowed to pass through first exhaust purification catalyst 31, so that the air-fuel ratio of the exhaust on the downstream side of first exhaust purification catalyst 31 changes from near the stoichiometric air-fuel ratio to rich.

In this way, when the amount of oxygen adsorbed by first exhaust purification catalyst 31 reaches the minimum amount, and the air-fuel ratio of the exhaust on the downstream side of first exhaust purification catalyst 31 is reversed to rich, air-fuel ratio control unit 511 sets the target air-fuel ratio to lean to cause the lean exhaust to flow into first exhaust purification catalyst 31 based on the fact that the output signal VO2R of oxygen sensor 35 becomes greater than the rich determination threshold value VA.

The inflow of the lean exhaust into first exhaust purification catalyst 31 causes the amount of adsorbed oxygen of first exhaust purification catalyst 31 to increase from the minimum amount to the saturation amount.

As described above, the active air-fuel ratio control by air-fuel ratio control unit 511 causes the amount of adsorbed oxygen of first exhaust purification catalyst 31 to change between the minimum amount and the saturation amount.

Here, within a reversal period of the air-fuel ratio (the period from time t1 to time t5 in FIG. 3), a period B (the period from time t2 to time t3 in FIG. 3) in which the air-fuel ratio of the exhaust on the downstream side of first exhaust purification catalyst 31 is maintained near the stoichiometric air-fuel ratio is a period in which the amount of adsorbed oxygen of first exhaust purification catalyst 31 actually increases or decreases.

In the period B in which the air-fuel ratio of the exhaust on the downstream side of first exhaust purification catalyst 31 is maintained near the stoichiometric air-fuel ratio, as the total amount of the exhaust that has flowed into first exhaust purification catalyst 31 is greater, the total amount of oxygen which has been adsorbed or discharged by first exhaust purification catalyst 31 in order to maintain the air-fuel ratio of the exhaust on the downstream side of first exhaust purification catalyst 31 near the stoichiometric air-fuel ratio is greater, so that the oxygen storage capability is high.

Instead of directly detecting the total amount of exhaust that has flowed into first exhaust purification catalyst 31, measurement unit 512 calculates the integration value QAIN of the intake air flow amount QA correlating with the total amount of exhaust as an index value of the oxygen storage capability.

However, as shown in FIG. 3, the reversal period of the air-fuel ratio detected based on the comparison between the output signal VO2R of oxygen sensor 35 and the thresholds VA and VB includes a period A and a period C other than the period B in which the air-fuel ratio of the exhaust on the downstream of first exhaust purification catalyst 31 is maintained near the stoichiometric air-fuel ratio.

In other words, when measurement unit 512 measures the oxygen storage capability during the reversal period of the output signal VO2R of oxygen sensor 35 (the period from time t1 to time t5 in FIG. 3), the measurement period MP includes the period A and the period C in addition to the period B which originally indicates the oxygen storage capability.

Here, the period A (the period from time t1 to time t2 in FIG. 3) from the reversal of the air-fuel ratio until the air-fuel ratio of the exhaust on the downstream side of first exhaust purification catalyst 31 reaches near the stoichiometric air-fuel ratio is a delay period until the purification catalyst 31 begins oxidation-reduction reaction, in other words, adsorption or release of oxygen.

Furthermore, the period C (the period from time t3 to time t5 in FIG. 3) until the air-fuel ratio of the exhaust on the downstream side of first exhaust purification catalyst 31 is reversed from the time of end TE of the period B in which the air-fuel ratio of the exhaust on the downstream side of first exhaust purification catalyst 31 is maintained near the stoichiometric air-fuel ratio is a period of waiting for a response of the output signal VO2R of oxygen sensor 35 from the time when the oxygen storage amount of first exhaust purification catalyst 31 reaches its limit (saturation amount or minimum amount) and the air-fuel ratio of the exhaust on the downstream side of first exhaust purification catalyst 31 begins to change from near the stoichiometric air-fuel ratio to rich or lean.

Here, the length of the above period C is longer as the response of oxygen sensor 35 is slower, more specifically, as the rate of change ΔVO2R of the output signal VO2R with respect to the reversal of the air-fuel ratio is slower.

Figure 4:
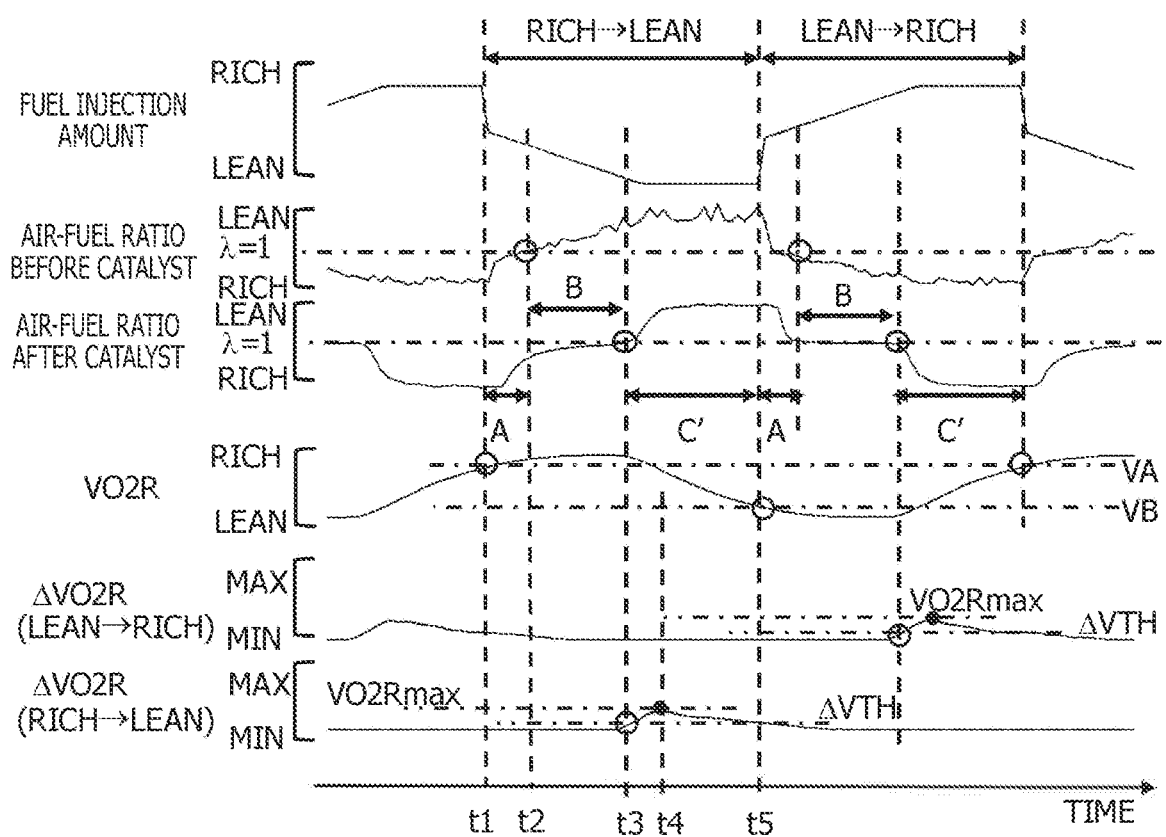
FIG. 4 is a time chart showing a state change during execution of a catalyst deterioration diagnosis when the response of the oxygen sensor is slow.

FIG. 4 is a time chart showing extension of the period C when the response of oxygen sensor 35 is slower than that in the case of FIG. 3.

Note that the response delay of oxygen sensor 35 is a delay within a range which is determined to be normal in failure diagnosis of oxygen sensor 35, and this includes a case in which the response is relatively slow from the initial state due to product variations of oxygen sensor 35, and a case in which the response is slower than that in the initial state due to aging degradation.

If the measurement period MP of the oxygen storage capability includes the period C, when the response of oxygen sensor 35 is slow and the period C is long, the measurement period MP is extended regardless of the actual oxygen storage capability.

Therefore, if the measurement period MP of the oxygen storage capability includes the period C, when the response of oxygen sensor 35 is slow, the oxygen storage capability of first exhaust purification catalyst 31 actually deteriorates, but the integration value QAIN of the intake air flow amount QA becomes the same value as that when first exhaust purification catalyst 31 is normal, so that control device 51 (diagnostic unit 513) may erroneously diagnose first exhaust purification catalyst 31 as being normal.

On the other hand, if measurement unit 512 measures the oxygen storage capability in the measurement period MP which does not include the period C, it is possible to suppress the effect of the response variation of oxygen sensor 35, so that the accuracy of the deterioration diagnosis of first exhaust purification catalyst 31 can be enhanced.

Therefore, based on the output signal VO2R of oxygen sensor 35, measurement unit 512 detects that the air-fuel ratio of the exhaust on the downstream side of first exhaust purification catalyst 31 begins to change from the stoichiometric air-fuel ratio to rich or lean, that is, the time of end (the time t3 in FIG. 3 or FIG. 4) of the period B in which the stoichiometric air-fuel ratio is maintained near.

Furthermore, measurement unit 512 sets the time of end of the period B as the time of end TE of the measurement period MP of the oxygen storage capability, thereby measuring the oxygen storage capability in the measurement period MP that does not include the period C.

As shown in FIGS. 3 and 4, the rate of change ΔVO2R of the output signal VO2R of oxygen sensor 35 increases and reaches a local maximum value when the air-fuel ratio of the exhaust on the downstream side of first exhaust purification catalyst 31 begins to change from near the stoichiometric air-fuel ratio to rich or lean within the reversal period of the air-fuel ratio, and does not exhibit any remarkable change at other times.

In other words, a time point when the rate of change ΔVO2R of the output signal VO2R of oxygen sensor 35 exhibits an increasing change is a time point when the air-fuel ratio of the exhaust on the downstream side of first exhaust purification catalyst 31 begins to change from near the stoichiometric air-fuel ratio to rich or lean, and measurement unit 512 sets this time point as the time of end TE of the measurement period MP, whereby measurement unit 512 can measure the oxygen storage capability in the measurement period MP that does not include the response period C.

Therefore, measurement unit 512 detects a time point when the rate of change ΔVO2R exceeds the threshold value ΔVTH as a time point indicating that the air-fuel ratio of the exhaust on the downstream side of first exhaust purification catalyst 31 begins to change from near the stoichiometric air-fuel ratio to rich or lean, and sets the time point as the time of end TE of the measurement period MP.

However, as shown in FIG. 4, when the response of oxygen sensor 35 is slow, the local maximum value of ΔVO2R occurring when the air-fuel ratio of the exhaust on the downstream side of first exhaust purification catalyst 31 changes from near the stoichiometric air-fuel ratio to rich or lean is less than that when the response is fast.

Therefore, countermeasures are required to make it possible to stably detect the time of end of the period B by comparing the rate of change ΔVO2R and the threshold value ΔVTH even if there is variation in the local maximum value of the rate of change ΔVO2R caused by variation in the response of oxygen sensor 35.

As the foregoing countermeasure, measurement unit 512 determines the maximum value ΔVO2R max of the rate of change ΔVO2R within the reversal period of the air-fuel ratio, and changes the threshold value ΔVTH according to the maximum value ΔVO2R max.

In other words, measurement unit 512 changes the threshold value ΔVTH in accordance with the change in the maximum value ΔVO2R max caused by the variation in response of oxygen sensor 35, which makes it possible to determine the increasing change of the rate of change ΔVO2R of oxygen sensor 35 even when the response of oxygen sensor 35 is slow and the maximum value ΔVO2R max is relatively small.

Furthermore, when the rate of change ΔVO2R exceeds the threshold value ΔVTH at a plurality of times during the reversal period of the air-fuel ratio, measurement unit 512 detects the time point when the rate of change ΔVO2R finally exceeds the threshold value ΔVTH, as a time point (time of end of the period B) indicating that the air-fuel ratio of the exhaust on the downstream side of first exhaust purification catalyst 31 begins to change from near the stoichiometric air-fuel ratio to rich or lean.

When the threshold value ΔVTH is lowered according to the maximum value ΔVO2R max, for example, there is a possibility that the increasing change of the rate of change ΔVO2R when the air-fuel ratio of the exhaust on the downstream side of first exhaust purification catalyst 31 changes from rich or lean to near the stoichiometric air-fuel ratio (time t2 in FIG. 3 or FIG. 4) may exceed the threshold value ΔVTH.

In this case, the rate of change ΔVO2R exceeds the threshold value ΔVTH at two times of the time point when (the time of beginning of the period B) at which the air-fuel ratio of the exhaust on the downstream side of first exhaust purification catalyst 31 changes from rich or lean to near the stoichiometric air-fuel ratio, and the time point (time of end of the period B) at which the air-fuel ratio of the exhaust on the downstream side of first exhaust purification catalyst 31 begins to change from near the stoichiometric air-fuel ratio to rich or lean.

However, since measurement unit 512 detects, as the time of end of the period B, a time point at which the rate of change ΔVO2R finally exceeds the threshold ΔVTH, the time of end of the period B can be determined based on the rate of change ΔVO2R with high accuracy even when the threshold value ΔVTH is changed to a lower value.

Furthermore, measurement unit 512 detects the time of beginning TB of the measurement period MP as the time point (time t2 in FIG. 3 and FIG. 4) when the air-fuel ratio of the exhaust on the upstream side of first exhaust purification catalyst 31 detected by air-fuel ratio sensor 34 changes from rich or lean to near the stoichiometric air-fuel ratio.

In other words, the timing at which the air-fuel ratio of the exhaust on the upstream side of first exhaust purification catalyst 31 detected by air-fuel ratio sensor 34 changes from rich or lean to near the stoichiometric air-fuel ratio and the timing at which the air-fuel ratio of the exhaust on the downstream side of first exhaust purification catalyst 31 changes from rich or lean to near the stoichiometric air-fuel ratio are substantially synchronized with each other.

Therefore, measurement unit 512 sets, as the time of beginning TB of the measurement period MP, the time point at which the air-fuel ratio of the exhaust detected by air-fuel ratio sensor 34 is near the stoichiometric air-fuel ratio after the air-fuel ratio is reversed.

As a result, measurement unit 512 excludes, from the measurement period MP, the period A from the reversal of the air-fuel ratio until the first exhaust purification catalyst 31 begins the oxidation-reduction reaction, whereby the period B in which the air-fuel ratio of the exhaust on the downstream side of first exhaust purification catalyst 31 is maintained near the stoichiometric air-fuel ratio is set as the measurement period MP of the oxygen storage capability.

Figure 5:
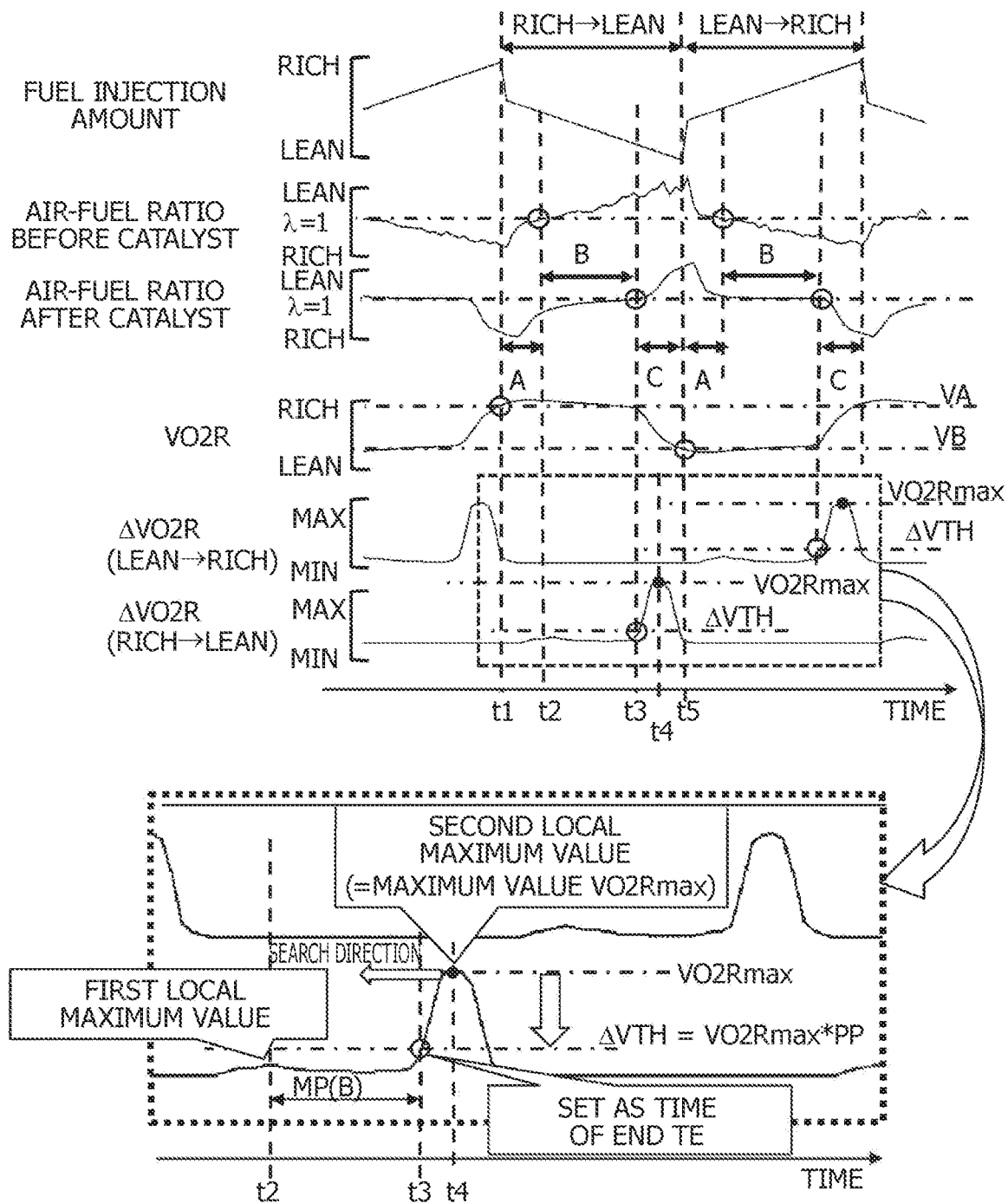
FIG. 5 is a time chart showing search processing for the time of end TE of a measurement period MP.
Figure 6:
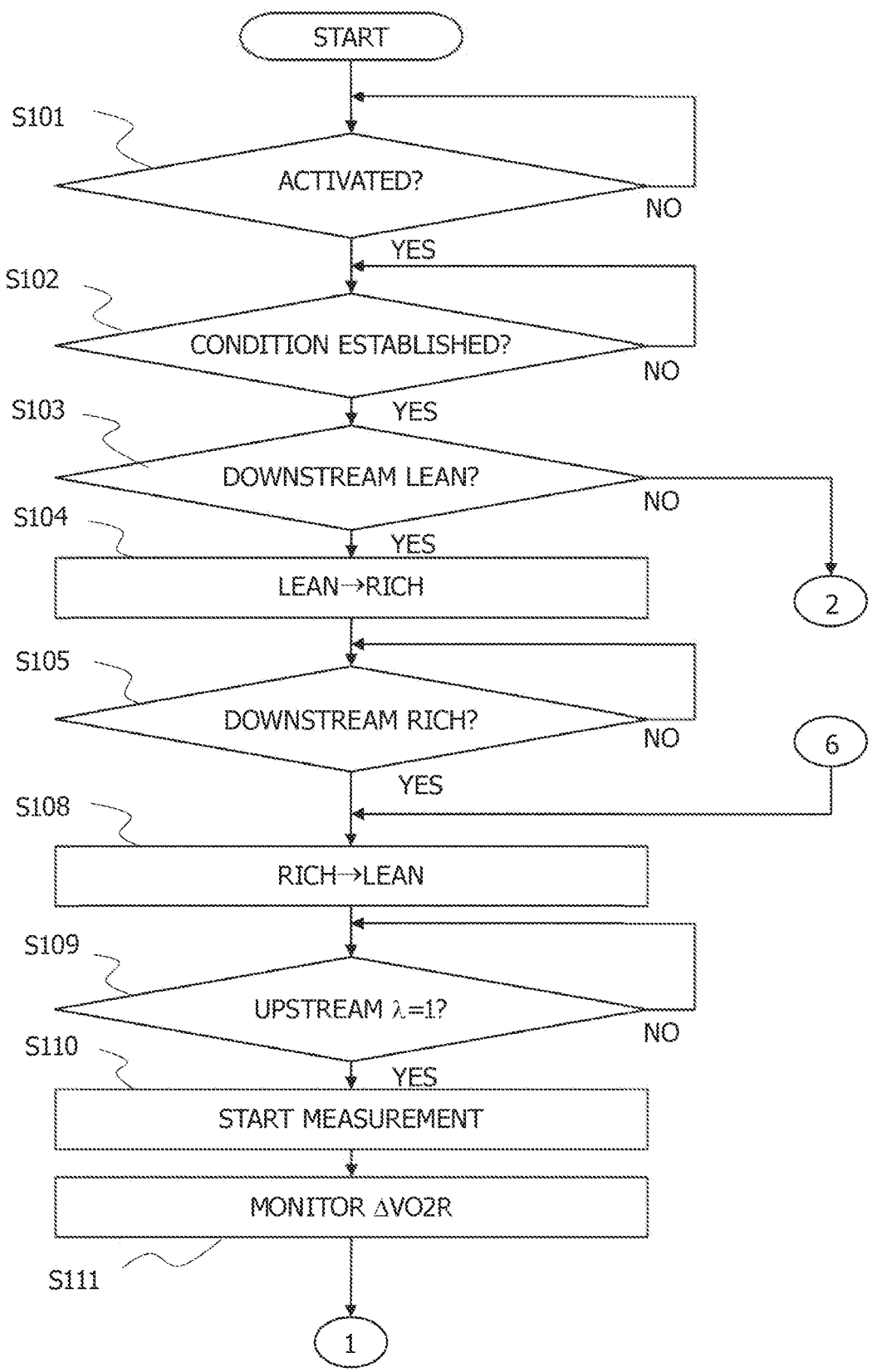
FIG. 6 is a flowchart showing a procedure of catalyst deterioration diagnosis.
Figure 7:
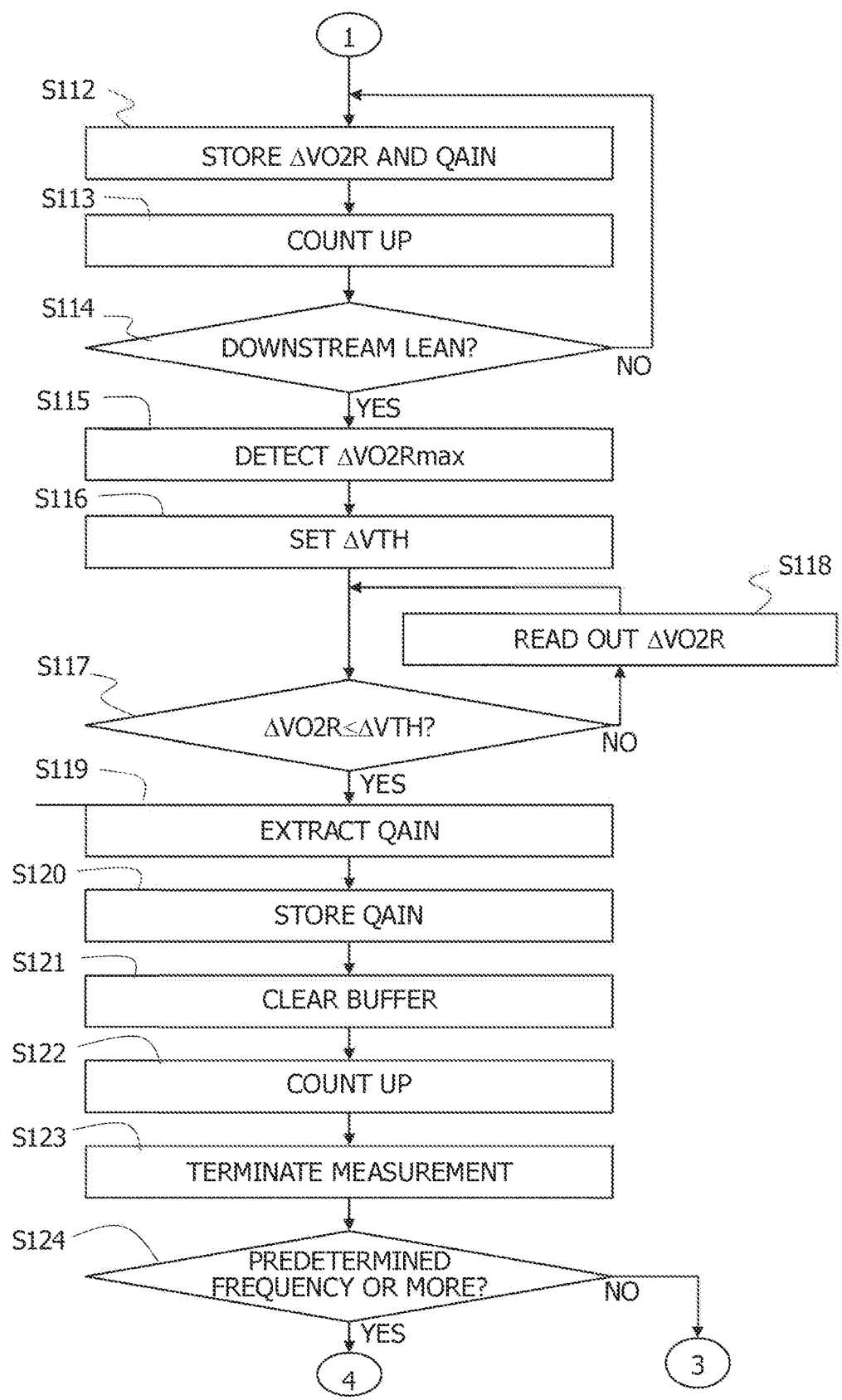
FIG. 7 is a flowchart showing the procedure of catalysis deterioration diagnosis.
Figure 8:
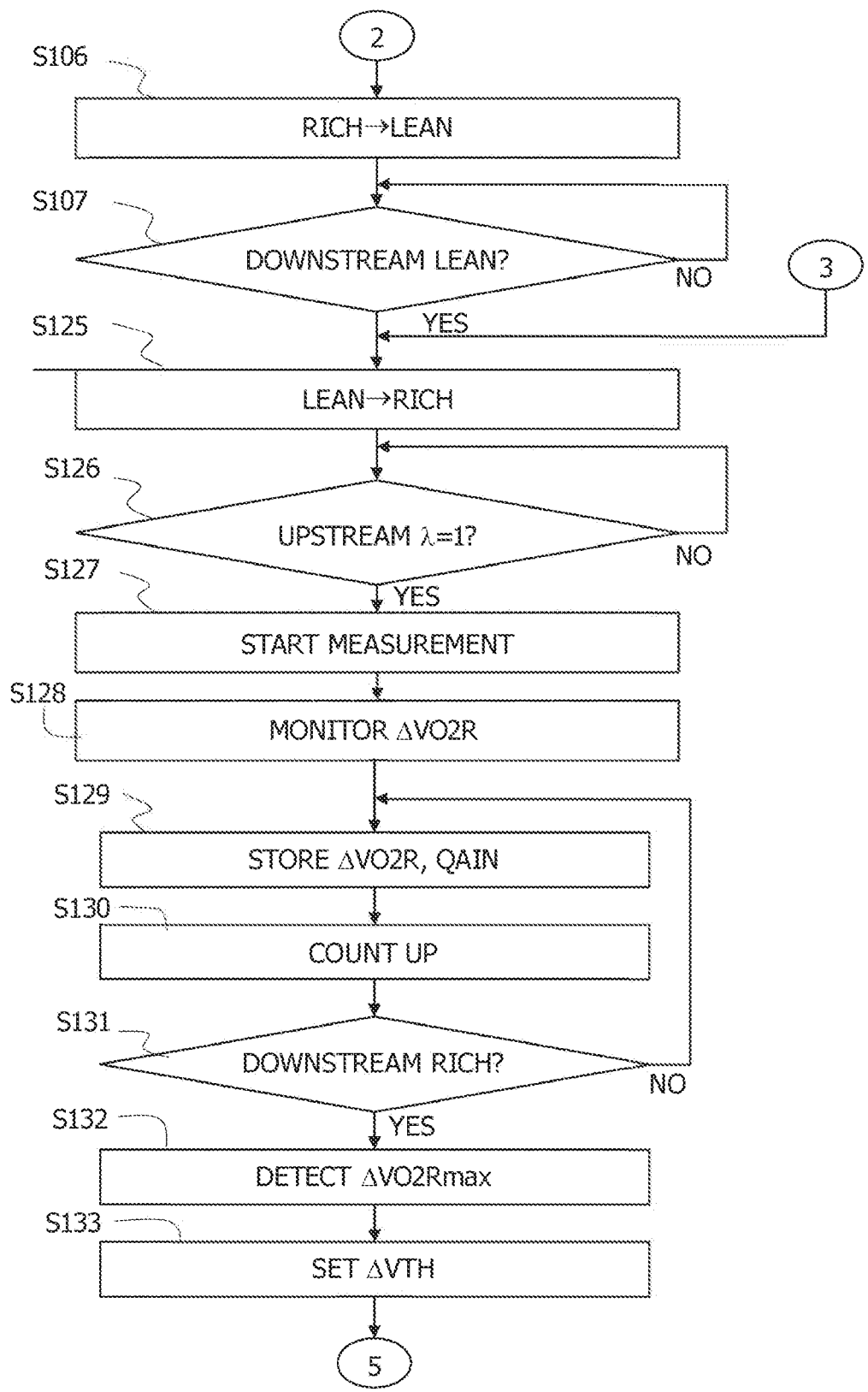
FIG. 8 is a flowchart showing the procedure of catalyst deterioration diagnosis.
Figure 9:
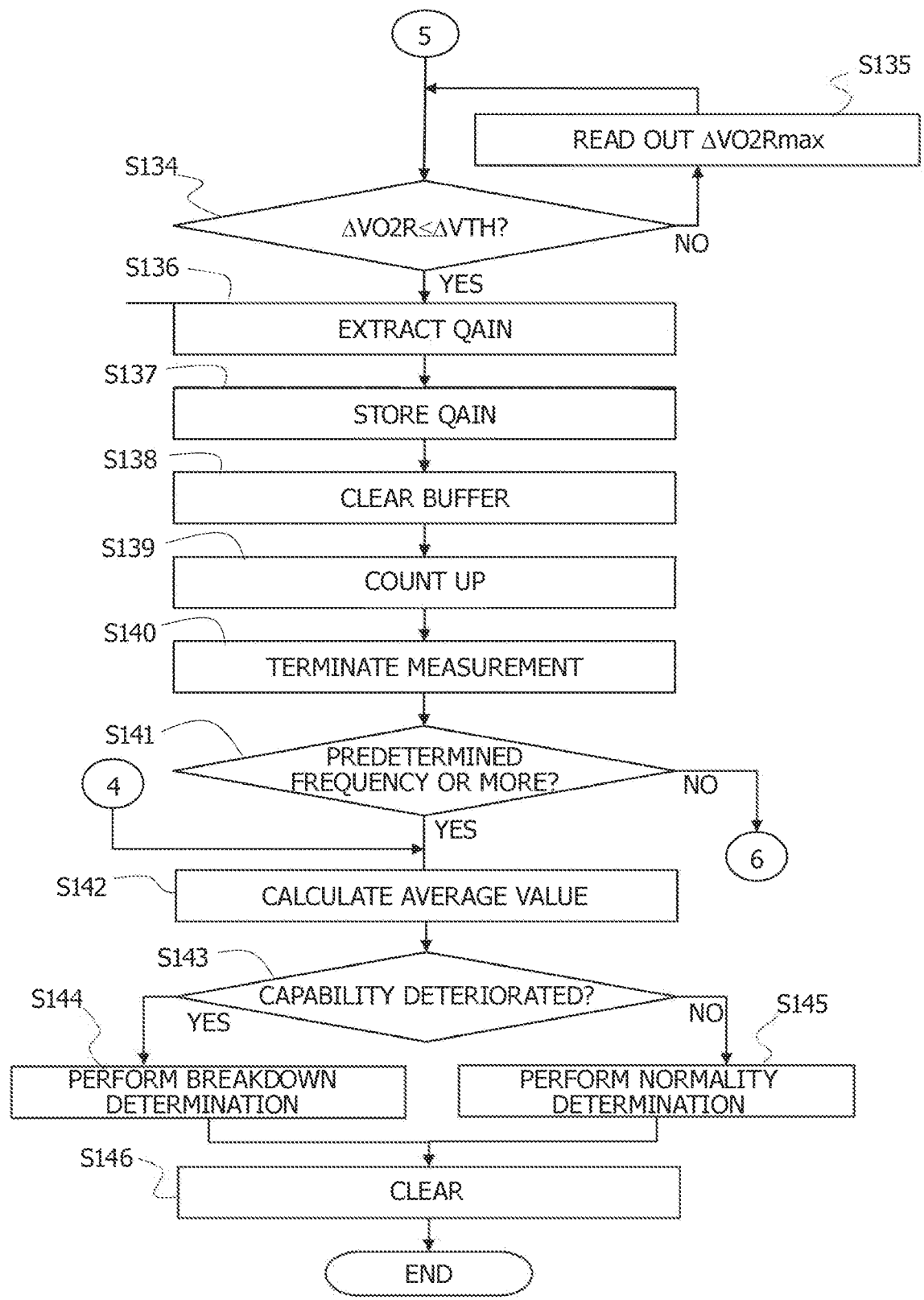
FIG. 9 is a flowchart showing the procedure of catalyst deterioration diagnosis.

FIG. 5 is a time chart showing a state change when a catalyst deterioration diagnosis is performed, and shows in detail the processing of searching, based on the rate of change ΔVO2R, the time point at which the air-fuel ratio of the exhaust on the downstream side of first exhaust purification catalyst 31 begins to change from near the stoichiometric air-fuel ratio to rich or lean.

An aspect of the search processing will be described below with reference to FIG. 5.

Measurement unit 512 periodically calculates the rate of change $\Delta VO2R$ and the integration value QAIN from the time point at which the air-fuel ratio of the exhaust on the upstream side of first exhaust purification catalyst 31 detected by air-fuel ratio sensor 34 has change from rich or lean to near the stoichiometric air-fuel ratio, and stores the calculated rate of change $\Delta VO2R$ and integration value QAIN in chronological order.

When measurement unit 512 detects the reversal of the air-fuel ratio of the exhaust on the downstream side of first exhaust purification catalyst 31 based on the output signal VO2R of oxygen sensor 35 (time t5 in FIG. 5), it determines the maximum value $\Delta VO2R$ max of the rate of change $\Delta VO2R$ which has been calculated and stored until that time (during the period from time t2 to time t5 in FIG. 5).

Next, measurement unit 512 decides a threshold value $\Delta VTH$ as a predetermined percentage of the maximum value $\Delta VO2R$ max.

Thereafter, measurement unit 512 repeats the processing of comparing the rate of change $\Delta VO2R$ stored in association with each time point with the threshold value $\Delta VTH$ while going back in time from a start point defined by the time point (time t4 in FIG. 5) at which the maximum value $\Delta VO2R$ max is obtained.

Here, measurement unit 512 sets, as the time of end TE of the measurement period MP, the time point (time t3 in FIG. 5) at which the rate of change $\Delta VO2R$ decreases to the threshold value $\Delta VTH$ or less for the first time, and outputs the data of the integration value QAIN stored in association with the time of end TE as an index value for oxygen storage capability to the diagnostic unit 513.

In other words, measurement unit 512 sets, as an index value for the oxygen storage capability, the integration value QAIN of the intake air flow amount QA in the period from the time t2 to the time t3 in FIG. 5, in other words, the integration value QAIN in the period in which the air-fuel ratio of the exhaust on the downstream side of first exhaust purification catalyst 31 is maintained near the stoichiometric air-fuel ratio.

Note that measurement unit 512 compares the rate of change $\Delta VO2R$ with the threshold value $\Delta VTH$ while going back in time, so that the time point at which the rate of change $\Delta VO2R$ decreases to the threshold value $\Delta VTH$ or less is a time point at which the rate of change $\Delta VO2R$ exceeds the threshold value $\Delta VTH$ in the normal flow of time.

According to the function of measurement unit 512, when the response of oxygen sensor 35 is slow, the rate of change $\Delta VO2R$ at which the air-fuel ratio of the exhaust on the downstream side of first exhaust purification catalyst 31 begins to change from near the stoichiometric air-fuel ratio to rich or lean is also slow. However, control device 51 lowers the threshold value $\Delta VTH$ in accordance with the slow rate of change $\Delta VO2R$.

Therefore, even if there is a difference in responsiveness of oxygen sensor 35, based on the comparison between the rate of change $\Delta VO2R$ and the threshold value $\Delta VTH$, control device 51 can accurately detect the time point at which the air-fuel ratio of the exhaust on the downstream side of first exhaust purification catalyst 31 begins to change from near the stoichiometric air-fuel ratio to rich or lean.

Furthermore, even if the rate of change $\Delta VO2R$ reaches a local maximum value (first local maximum value) at a plurality of times during the reversal period of the air-fuel ratio, control device 51 decides the threshold value $\Delta VTH$ based on the maximum value $\Delta VO2R$ max (a second local maximum value) during the reversal period of the air-fuel ratio, and decides, as the time of end TE of the measurement period MP, a time point when the rate of change $\Delta VO2R$ crosses the threshold value $\Delta VTH$ just before the time point at which the rate of change $\Delta VO2R$ reaches the maximum value $\Delta VO2R$ max (in other words, a time point at which the rate of change $\Delta VO2R$ finally crosses the threshold value $\Delta VTH$).

Therefore, for example, even if the output signal VO2R of oxygen sensor 35 fluctuates to cause the rate of change $\Delta VO2R$ to become the local maximum value when the air-fuel ratio of the exhaust on the downstream side of first exhaust purification catalyst 31 changes from rich or lean to near the stoichiometric air-fuel ratio (time t2 in FIG. 5), the local maximum value (first local maximum value) at this time does not become the maximum value, so that it is possible to prevent this fluctuation from affecting the setting of the threshold value $\Delta VTH$ and the searching for the time of end TE of the measurement period MP.

The procedure for deterioration diagnosis of the first exhaust purification catalyst 31 to be performed by control device 51 will be described in detail below with reference to the flowcharts of FIGS. 6 to 9.

At step S101, control device 51 determines whether oxygen sensor 35 has been activated and brought into a state of generating a desired output signal VO2R.

Control device 51 can determine whether oxygen sensor 35 has been activated, based on the comparison between the output signal VO2R of oxygen sensor 35 and the rich determination threshold value VA, the comparison between a detection value or estimation value of the temperature of first exhaust purification catalyst 31 and a determination temperature, and the like.

When control device 51 determines oxygen sensor 35 has been activated, it proceeds to step S102 to determine whether a condition for executing a deterioration diagnosis of the first exhaust purification catalyst 31 has been established.

Here, for example, as conditions for executing the catalyst deterioration diagnosis, control device 51 determines that internal combustion engine 11 is being operated within an operating range in which the catalyst diagnosis is performed, that the temperature of first exhaust purification catalyst 31 is within a set temperature range, that failure of air-fuel ratio sensor 34 or oxygen sensor 35 has not been diagnosed, and the like.

When control device 51 determines that the condition for executing the catalyst deterioration diagnosis is established, it proceeds to step S103 to determine based on the output signal VO2R of oxygen sensor 35 whether the air-fuel ratio of the exhaust on the downstream side of first exhaust purification catalyst 31 at the begin time point of the catalyst deterioration diagnosis is lean.

When the air-fuel ratio of the exhaust on the downstream side of first exhaust purification catalyst 31 is lean, the control device 51 proceeds to step S104 to begin active control of the fuel injection amount (in other words, active air-fuel ratio control) for reversing the air-fuel ratio of the exhaust on the downstream side of first exhaust purification catalyst 31 from lean to rich.

Next, control device 51 proceeds to step S105 to determine based on the output signal VO2R of oxygen sensor 35 whether the air-fuel ratio of the exhaust on the downstream side of first exhaust purification catalyst 31 has been reversed to rich as a result of the active control started in step S104.

Note that the fact that the air-fuel ratio of the exhaust on the downstream side of first exhaust purification catalyst 31 has been reversed from lean to rich indicates a state in which the amount of adsorbed oxygen in first exhaust purification catalyst 31 reaches the bottom, and first exhaust purification catalyst 31 cannot release oxygen.

When the air-fuel ratio of the exhaust on the downstream side of first exhaust purification catalyst 31 is reversed from lean to rich, control device 51 proceeds to step S108 to begin the active control of the fuel injection amount for reversing the air-fuel ratio of the exhaust on the downstream side of first exhaust purification catalyst 31 from rich to lean.

In other words, control device 51 brings the amount of adsorbed oxygen of first exhaust purification catalyst 31 into an empty state by the enrichment control in step S104, and then executes the lean control in step S108, thereby increasing the amount of adsorbed oxygen of first exhaust purification catalyst 31 from the empty state.

Next, control device 51 proceeds to step S109 to determine whether the air-fuel ratio of the exhaust on the upstream side of first exhaust purification catalyst 31 detected by air-fuel ratio sensor 34 has changed from lean to near the stoichiometric air-fuel ratio (specifically, within a predetermined air-fuel ratio range including the stoichiometric air-fuel ratio).

Then, control device 51 waits until the detection value of the air-fuel ratio by air-fuel ratio sensor 34 changes from lean to near the stoichiometric air-fuel ratio, and proceeds to the measurement processing of the oxygen storage capability to step S110 and subsequent steps thereto to measure the amount of oxygen adsorbed by first exhaust purification catalyst 31 under an atmosphere of lean exhaust.

In step S110, control device 51 resets the integration value QAIN of the intake air flow amount QA as an index value of the oxygen storage capability of first exhaust purification catalyst 31 to zero, and also turns on a calculation permission flag for the oxygen storage capability to begin the integration of the intake air flow amount QA (in other words, measurement of the oxygen storage capability).

In other words, after the time point (time t1 in FIG. 5) at which the active air-fuel ratio control for reversing the air-fuel ratio of the exhaust on the downstream side of first exhaust purification catalyst 31 from rich to lean is started, control device 51 begins to measure the oxygen storage capability with the time point (time t2 in FIG. 5) at which the detection value of the air-fuel ratio by air-fuel sensor 34 becomes equal to near the stoichiometric air-fuel ratio being set as the time of beginning TB of the measurement period MP of the oxygen storage capability.

Note that in step S108, control device 51 can begin the measurement of the oxygen storage capability (in detail, the integration of the intake air flow amount QA) with the time point (time t1 in FIG. 5) at which the active control of the fuel injection amount for reversing the air-fuel ratio of the exhaust on the downstream side of first exhaust purification catalyst 31 from rich to lean is started being set as the time of beginning TB of the measurement period MP of the oxygen storage capability.

In other words, control device 51 can omit the processing of step S109 and perform the measurement of the oxygen storage capability.

Furthermore, control device 51 likewise can omit step S126 when measuring an oxygen release amount, described later, and begin the measurement of the oxygen storage capability from the time point when the active control of the fuel injection amount for reversing the air-fuel ratio of the exhaust on the downstream side of first exhaust purification catalyst 31 from lean to rich is started.

Next, in step S111, control device 51 begins calculation processing of the rate of change $\Delta VO2R$ of the output signal VO2R of the oxygen sensor 35.

Control device 51 acquires the amount of change in the output signal VO2R in the latest fixed period of time for each predetermined calculation period, and sets the absolute value of the amount of change as the rate of change $\Delta VO2R$.

In the next step S112, control device 51 pairs the latest calculation value of the rate of change $\Delta VO2R$ and the integration value QAIN of the intake air flow amount QA at the time point at which the rate of change $\Delta VO2R$ is acquired, and stores them in a buffer.

Next, in step S113, control device 51 counts up a monitor counter of the rate of change $\Delta VO2R$, and associates it with the monitor counter, the rate of change $\Delta VO2R$, and the integration value QAIN.

Next, in step S114, control device 51 determines whether the air-fuel ratio of the exhaust on the downstream side of first exhaust purification catalyst 31 has reversed from rich to lean, based on whether the output signal VO2R of oxygen sensor 35 is less than the lean determination threshold value VB.

Then, when the output signal VO2R of oxygen sensor 35 is equal to or greater than the lean determination threshold value VB, control device 51 returns to step S112 to continue monitoring of the rate of change $\Delta VO2R$ and the integration of the intake air flow amount QA.

On the other hand, when the output signal VO2R of oxygen sensor 35 decreases to be less than the lean determination threshold value VB (time t5 in FIG. 5), control device 51 stops the calculation of the rate of change $\Delta VO2R$ and the integration of the intake air flow amount QA, and proceeds from S114 to step S115.

In step S115, control device 51 specifies a time point (time t4 in FIG. 5) at which the maximum value $\Delta VO2R$ max of the rate of change $\Delta VO2R$ is acquired, within the period from the time point (time t2 in FIG. 5) at which the detection value of the air-fuel ratio by air-fuel ratio sensor 34 has reached near the stoichiometric air-fuel ratio to the time point (time t5 in FIG. 5) at which the output signal VO2R of oxygen sensor 35 decreases to be less than the lean determination threshold value VB.

Next, in step S116, control device 51 decides the threshold value $\Delta VTH$ of the rate of change $\Delta VO2R$ for determining the time of end TE of the measurement period MP of the oxygen storage capability based on the maximum value $\Delta VO2R$ max.

Here, control device 51 sets, for example, a predetermined percentage PP [%] (0%<PP<100%) of the maximum value $\Delta VO2R$ max as the threshold value $\Delta VTH$ ($\Delta VTH = \Delta VO2R$ max×PP).

In the next step S117, control device 51 reads out the rate of change $\Delta VO2R$ at the time point of assigning the monitor counter according to the monitor counter from the buffer, and determines whether the read-out rate of change $\Delta VO2R$ is equal to or less than the threshold value $\Delta VTH$.

Note that an initial value of the monitor counter in the processing of reading out the rate of change $\Delta VO2R$ from the buffer by control device 51 in step S117 is a monitor counter when the maximum value $\Delta VO2R$ max is obtained.

When the rate of change $\Delta VO2R$ is greater than the threshold value $\Delta VTH$, control device 51 proceeds to step S118 to set a monitor counter only one count before, reads out, from the buffer, the rate of change ΔVO2R at the time point at which the monitor counter is assigned, and then returns to step S117 again.

On the other hand, when control device 51 determines in step S117 that the rate of change ΔVO2R is equal to or less than the threshold value ΔVTH, control device 51 proceeds to step S119 to read out, from the buffer, the integration value QAIN of the intake air flow amount QA stored in association with the monitor counter at the time when it is determined that the rate of change ΔVO2R is equal to or less than the threshold value ΔVTH.

In the next step S120, control device 51 stores the read-out integration value QAIN of the intake air flow amount QA in the buffer as an index value indicating the oxygen storage capability for catalyst deterioration diagnosis.

As described above, control device 51 goes back in time from the time point (time t4 in FIG. 5) at which the rate of change ΔVO2R reaches the maximum value ΔVO2R max, and searches for a time point at which the rate of change ΔVO2R becomes equal to or less than the threshold value ΔVTH for the first time, thereby determining a time point at which the rate of change ΔVO2R exceeds the threshold value ΔVTH in the normal time lapse, and setting the time point at which the rate of change ΔVO2R exceeds the threshold value ΔVTH, as the time of end TE of the measurement period MP of the oxygen storage capability.

Here, the time point at which the rate of change ΔVO2R exceeds the threshold value ΔVTH is a time point at which the air-fuel ratio of the exhaust on the downstream side of first exhaust purification catalyst 31 begins to change from near the stoichiometric air-fuel ratio to lean.

In other words, control device 51 sets, as a measurement period MP, a period for which the air-fuel ratio of the exhaust on the downstream side of first exhaust purification catalyst 31 is maintained near the stoichiometric air-fuel ratio from the time point (time t2 in FIG. 5) at which the detection value of the air-fuel ratio by air-fuel ratio sensor 34 changes from rich to near the stoichiometric air-fuel ratio until the time point (time t3 in FIG. 5) at which the rate of change ΔVO2R exceeds the threshold value ΔVTH., and also sets the integration value QAIN of the intake air flow amount QA during the measurement period MP as an index value for the oxygen storage capability.

Control device 51 continues the integration processing of the intake air flow amount QA until the output signal VO2R of oxygen sensor 35 decreases to be less than the lean determination threshold value VB. In this case, the integration period of the intake air flow amount QA includes the response period C of oxygen sensor 35.

Therefore, from the history of the rate of change ΔVO2R, control device 51 searches for the time point at which the air-fuel ratio of the exhaust on the downstream side of first exhaust purification catalyst 31 begins to change from the stoichiometric air-fuel ratio to lean, that is, the time of beginning of the response period C, and extracts the stored value of the integration value QAIN of the intake air flow amount QA at the time point at which searching is performed, as an index value of the oxygen storage capability to be used for catalyst deterioration diagnosis.

As a result, control device 51 performs the catalyst deterioration diagnosis based on the oxygen storage capability measured during the measurement period MP excluding the response period C of oxygen sensor 35.

In step S121, control device 51 clears the rate of change ΔVO2R, the monitor counter, and the integration value QAIN of the intake air flow amount QA which are stored in the buffer to prepare for the measurement of the oxygen storage capability in a next air-fuel reversal period.

Subsequently, control device 51 proceeds to step S122 to count up a frequency at which the oxygen storage capability when first exhaust purification catalyst 31 adsorbs oxygen is measured.

Furthermore, in step S123, control device 51 turns off the calculation permission flag for the oxygen storage capability that was turned on in step S110, and terminates the measurement processing for the oxygen storage capability at the time when first exhaust purification catalyst 31 adsorbs oxygen.

Next, control device 51 proceeds to step S124 to determine whether each of the measurement frequency of the oxygen storage capability at the time when first exhaust purification catalyst 31 adsorbs oxygen, and the measurement frequency of the oxygen storage capability at the time when first exhaust purification catalyst 31 releases oxygen is equal to or greater than a predetermined frequency.

Note that control device 51 executes of the measurement of the oxygen storage capability at the time when first exhaust purification catalyst 31 releases oxygen in steps S125 to 140, described later.

When determining in step S124 that each of both the measurement frequencies are equal to or greater than a predetermined frequency, control device 51 proceeds from step S124 to the catalyst deterioration diagnosis processing of step S142 and subsequent steps.

In step S142, control device 51 calculates the average value of the integration value QAIN of the intake air flow amount QA which is an index value for the oxygen storage capability measured when first exhaust purification catalyst 31 adsorbs oxygen, and the integration value QAIN of the intake air flow amount QA which is an index value for the oxygen storage capability measured when first exhaust purification catalyst 31 releases oxygen.

Subsequently, control device 51 proceeds to step S143 to determine whether the average value of the integration value QAIN obtained in step S142 is equal to or less than a determination value, that is, whether the oxygen storage capacity in first exhaust purification catalyst 31 has decreased to a capacity under a deteriorated state, in other words, a capacity falling below a minimum allowable amount of oxygen storage capacity.

Here, when the average value of the integration value QAIN is equal to or less than the determination value, control device 51 proceeds to step S144 to determine deterioration of first exhaust purification catalyst 31, and performs processing under catalyst deterioration.

The above-described processing under catalyst deterioration includes, for example, processing of storing a catalyst deterioration determination history in a non-volatile memory, processing of turning on a warning light to warn of occurrence of a breakdown in first exhaust purification catalyst 31 (or an exhaust system), processing for changing the control specification of internal combustion engine 11, and the like.

On the other hand, when the average value of the integration value QAIN exceeds the determination value, control device 51 proceeds to step S145 to determine whether first exhaust purification catalyst 31 is normal.

After determining whether first exhaust purification catalyst 31 is in a normal state or in a deteriorated state as described above, control device 51 proceeds to step S146.

In step S146, control device 51 clears each of the measurement frequency of the oxygen storage capability at the time when first exhaust purification catalyst 31 adsorbs oxygen and the measurement frequency of the oxygen storage capability at the time when first exhaust purification catalyst 31 releases oxygen, and terminates the deterioration diagnosis processing of first exhaust purification catalyst 31.

Furthermore, when determining in step S124 that the measurement frequency of the oxygen storage capability has not reached the predetermined value, control device 51 proceeds to step S125 and subsequent steps to measure the oxygen storage capability at the time when first exhaust purification catalyst 31 releases oxygen.

When determining in step S103 that the air-fuel ratio of the exhaust on the downstream side of first exhaust purification catalyst 31 at the begin time point of catalyst diagnosis is rich, control device 51 proceeds to step S106.

In step S106, control device 51 begins the active control of the fuel injection amount for reversing the air-fuel ratio of the exhaust on the downstream side of first exhaust purification catalyst 31 from rich to lean.

In the next step S107, control device 51 determines based on the output signal VO2R of oxygen sensor 35 whether the air-fuel ratio of the exhaust on the downstream side of first exhaust purification catalyst 31 has reversed from rich to lean as a result of the active control started in step S106.

When detecting that the air-fuel ratio of the exhaust on the downstream side of first exhaust purification catalyst 31 has been reversed from rich to lean, in other words, when estimating that the amount of oxygen adsorbed by oxygen sensor 35 has reached the saturation amount, control device 51 proceeds to step S125 and subsequent steps to measure the oxygen storage capability at the time when first exhaust purification catalyst 31 releases oxygen.

In steps S125 to S140, control device 51 measures the oxygen storage capability at the time when first exhaust purification catalyst 31 releases oxygen.

The processing content of control device 51 in steps S125 to S140 will be outlined below.

Control device 51 first begins the active control of the fuel injection amount for reversing the air-fuel ratio of the exhaust on the downstream side of first exhaust purification catalyst 31 from lean to rich (step S125).

Next, control device 51 sets, as the time of beginning TB of the measurement period MP of the oxygen storage capability, the time point when the air-fuel ratio of the exhaust on the upstream side of first exhaust purification catalyst 31 detected by air-fuel ratio sensor 34 changes from lean to near the stoichiometric air-fuel ratio (step S126).

Control device 51 performs the update of the integration value QAIN of the intake air flow amount QA and the calculation of the rate of change $\Delta$VO2R in each calculation cycle during the period from the time of beginning TB of the measurement period MP until the output signal VO2R of oxygen sensor 35 exceeds the rich determination threshold value VA, and stores the calculation result in the buffer in chronological order (steps S127 to step S131).

When the output signal VO2R of oxygen sensor 35 has increased to be equal to or greater than the rich determination threshold value VA, control device 51 obtains the maximum value $\Delta$VO2R max out of the rates of change $\Delta$VO2R which have been stored so far, and sets the threshold value $\Delta$VTH based on the maximum value $\Delta$VO2R max (step S131 to step S133).

Next, control device 51 repeats the comparison between the rate of change $\Delta$VO2R at each time point and the threshold value $\Delta$VTH while going back in time from the time point at which the rate of change $\Delta$VO2R has reached the maximum value $\Delta$VO2R max, and sets, as the time of end TE of the measurement period MP, the time point at which the rate of change $\Delta$VO2R decreases to the threshold value $\Delta$VTH or less for the first time (steps S134 to S135).

Then, control device 51 determines the integration value QAIN of the intake air flow amount QA at the time of end TE as an index value for the oxygen storage capability of first exhaust purification catalyst 31, and terminates the measurement processing of the oxygen storage capability when the first exhaust purification catalyst 31 releases oxygen by reversing the air-fuel ratio from lean to rich (steps S136 to S140).

After completing the measurement processing of the oxygen storage capability when first exhaust purification catalyst 31 releases oxygen, control device 51 proceeds to step S141.

In step S141, control device 51 determines whether each of the measurement frequency of the oxygen storage capability when first exhaust purification catalyst 31 adsorbs oxygen, and the measurement frequency of the oxygen storage capability when first exhaust purification catalyst 31 releases oxygen, is equal to or greater than a predetermined frequency.

When each of both the measurement frequencies is equal to or greater than the predetermined frequency, control device 51 proceeds to the processing of catalyst deterioration diagnosis of step S142 and subsequent steps.

On the other hand, when determining in step S141 that the measurement frequency of the oxygen storage capability is insufficient, control device 51 proceeds to the above-described step S108 and subsequent steps to measure the oxygen storage capability when first exhaust purification catalyst 31 adsorbs oxygen.

In the deterioration diagnosis processing of first exhaust purification catalyst 31 shown in the flowcharts of FIGS. 6 to 9, the time point at which the rate of change $\Delta$VO2R of the output signal VO2R of oxygen sensor 35 exceeds the threshold value $\Delta$VTH corresponds to the time point indicating that the air-fuel ratio of the exhaust on the downstream side of first exhaust purification catalyst 31 begins to change from the stoichiometric air-fuel ratio to rich or lean.

As a result, control device 51 measures the oxygen storage capability of first exhaust purification catalyst 31 in the measurement period MP which does not include the period C corresponding to the response period of oxygen sensor 35.

Therefore, even when the response of oxygen sensor 35 is slow, and thus the period C is long (see FIG. 4), control device 51 can measure the oxygen storage capability of first exhaust purification catalyst 31 without being affected by the extension of the period C (in other words, the response delay of oxygen sensor 35), and can perform the deterioration diagnosis of first exhaust purification catalyst 31 with high accuracy based on the measured oxygen storage capability.

Furthermore, control device 51 sets the threshold value $\Delta$VTH based on the maximum value $\Delta$VO2R max of the rate of change $\Delta$VO2R, and further sets, as the time of end TE of the measurement period MP, the time point at which the rate of change $\Delta$VO2R decreases to the threshold value $\Delta$VTH or less for the first time while going back in time from the time point when the rate of change $\Delta$VO2R reaches the maximum value $\Delta$VO2R max.

As a result, control device 51 can accurately detect the time point at which the air-fuel ratio of the exhaust on the downstream side of first exhaust purification catalyst 31 begins to change from the stoichiometric air-fuel ratio to rich or lean even when there is any variation in the rate of change $\Delta$VO2R.

Respective technical ideas described in the above embodiments can be used in appropriate combination as long as there is no conflict among them.

Although the content of the present invention has been specifically described with reference to the preferred embodiments, it is obvious to those skilled in the art that various modifications can be adopted based on the basic technical idea and teaching of the present invention.

For example, control device 51 can have the threshold value ΔVTH as a fixed value.

Control device 51 compares the threshold value ΔVTH as the fixed value with the rate of change ΔVO2R each time the rate of change ΔVO2R is calculated, and stores the integration value QAIN each time the rate of change ΔVO2R becomes equal to or greater than the threshold ΔVTH, whereby the last data of the integration value QAIN which has been stored until the output signal VO2R of oxygen sensor 35 has been reversed can be set as an index value for the oxygen storage amount.

Furthermore, when internal combustion engine 11 includes an air-fuel ratio sensor on the downstream side of first exhaust purification catalyst 31 instead of oxygen sensor 35, control device 51 can set, as the time of end TE of the measurement period MP, the time point at which the air-fuel ratio detected by the air-fuel ratio sensor on the downstream side of first exhaust purification catalyst 31 has changed from near the stoichiometric air-fuel ratio to rich or lean, and measure the oxygen storage amount.

Furthermore, in the calculation of the average value in step S142, control device 51 can perform processing of excluding the maximum value and/or the minimum value among a plurality of integration values QAIN from the data for calculating the average value.

Furthermore, control device 51 can make breakdown determination of oxygen sensor 35 or cancel the catalyst deterioration diagnosis when the maximum value ΔVO2R max falls below a set value.

REFERENCE SYMBOL LIST

11 Internal combustion engine
31 First exhaust purification catalyst (exhaust purification catalyst)
34 Air-fuel ratio sensor
35 Oxygen sensor (exhaust sensor)
51 Control device

The invention claimed is:

1. An internal combustion engine control device for controlling an internal combustion engine, the internal combustion engine including an exhaust purification catalyst that has oxygen storage capability and an oxygen sensor that detects whether an air-fuel ratio of exhaust on a downstream side of the exhaust purification catalyst is rich or lean, the internal combustion engine control device comprising:
  an air-fuel ratio control unit that controls an amount of fuel to be supplied to the internal combustion engine such that the air-fuel ratio of the exhaust on the downstream side of the exhaust purification catalyst is alternately switched between rich and lean;
  a measurement unit that measures the oxygen storage capability of the exhaust purification catalyst during a measurement period within a reversal period of the air-fuel ratio by the air-fuel ratio control unit; and
  a diagnostic unit that diagnoses deterioration of the exhaust purification catalyst based on a measurement value of the oxygen storage capability,
  wherein the measurement unit is configured to set, as a time of end of the measurement period, a time point at which an output of the oxygen sensor indicates that the air-fuel ratio of the exhaust on the downstream side of the exhaust purification catalyst begins to change from a stoichiometric air-fuel ratio to rich or lean,
  wherein the measurement unit determines a time point at which a rate of change of the output of the oxygen sensor exceeds a threshold value as the time point indicating that the air-fuel ratio of the exhaust on the downstream side of the exhaust purification catalyst begins to change from near the stoichiometric air-fuel ratio to rich or lean, and
  wherein the measurement unit determines a maximum value of the rate of change of the output of the oxygen sensor within the reversal period of the air-fuel ratio by the air-fuel ratio control unit, and lowers the threshold value as the maximum value is decreased.

2. The internal combustion engine control device according to claim 1, wherein when the rate of change of the output of the oxygen sensor exceeds the threshold value at a plurality of times during the reversal period of the air-fuel ratio by the air-fuel ratio control unit, the measurement unit defines a time point at which the rate of change of the output of the oxygen sensor finally exceeds the threshold value, as the time point indicating that the air-fuel ratio of the exhaust on the downstream side of the exhaust purification catalyst begins to change from near the stoichiometric air-fuel ratio to rich or lean.

3. The internal combustion engine control device according to claim 1, wherein the internal combustion engine further includes an air-fuel ratio sensor for outputting a signal corresponding to an air-fuel ratio of the exhaust on an upstream side of the exhaust purification catalyst, and the measurement unit sets, as a time of beginning of the measurement period, a time point at which the air-fuel ratio of the exhaust detected by the air-fuel ratio sensor has changed from rich or lean to near the stoichiometric air-fuel ratio.

4. The internal combustion engine control device according to claim 1, wherein the measurement unit sets, as a time of beginning of the measurement period, a time point at which the air-fuel ratio control unit begins to change an amount of fuel to be supplied to the internal combustion engine so that the air-fuel ratio of the exhaust on the downstream side of the exhaust purification catalyst is reversed.

5. A catalyst deterioration diagnostic method for diagnosing deterioration of an exhaust purification catalyst in an internal combustion engine, the method performed by a control device for controlling the internal combustion engine including the exhaust purification catalyst that has oxygen storage capability and an oxygen sensor that detects whether an air-fuel ratio of exhaust on a downstream side of the exhaust purification catalyst is rich or lean, the method comprising:
  an air-fuel ratio controlling step of controlling an amount of fuel to be supplied to the internal combustion engine such that the air-fuel ratio of the exhaust on the downstream side of the exhaust purification catalyst is alternately switched between rich and lean;
  a measuring step of measuring the oxygen storage capability of the exhaust purification catalyst during a measurement period within a reversal period of the air-fuel ratio;
  a diagnosing step of diagnosing deterioration of the exhaust purification catalyst based on a measurement value of the oxygen storage capability, wherein the measuring step includes a time of end detecting step of setting, as a time of end of the measurement period, a time point at which an output of the oxygen sensor indicates that the air-fuel ratio of the exhaust on the downstream side of the exhaust purification catalyst begins to change from a stoichiometric air-fuel ratio to rich or lean, wherein the time of end detecting step comprises:

determining a time point at which a rate of change of the output of the oxygen sensor exceeds a threshold value as the time point indicating that the air-fuel ratio of the exhaust on the downstream side of the exhaust purification catalyst begins to change from near the stoichiometric air-fuel ratio to rich or lean; and determining a maximum value of the rate of change of the output of the oxygen sensor within the reversal period of the air-fuel ratio by the air-fuel ratio control unit, and lowering the threshold value as the maximum value is decreased.

* * * * *